United States Patent [19]

Moon et al.

[11] Patent Number: 5,783,926
[45] Date of Patent: Jul. 21, 1998

[54] APPARATUS FOR IDENTIFYING ACCESSORIES CONNECTED TO RADIOTELEPHONE EQUIPMENT

[75] Inventors: Billy Gayle Moon, Apex; William C. Agnor, Raleigh, both of N.C.

[73] Assignee: Ericsson, Inc., Research Triangle Park, N.C.

[21] Appl. No.: 744,102

[22] Filed: Nov. 5, 1996

[51] Int. Cl.$^6$ ............................................. H01M 10/46
[52] U.S. Cl. ............................................. 320/106; 320/110
[58] Field of Search .............................. 320/2, 5, 6, 15, 320/30, 48, 106, 110, 116, 134, 136, DIG. 18; 429/90, 149

[56] References Cited

U.S. PATENT DOCUMENTS

| | | | |
|---|---|---|---|
| 4,593,409 | 6/1986 | Miller | 320/48 X |
| 4,849,682 | 7/1989 | Bauer et al. | 320/15 |
| 5,164,652 | 11/1992 | Johnson et al. | 320/15 |
| 5,200,686 | 4/1993 | Lee | 320/2 |
| 5,206,097 | 4/1993 | Burns et al. | 320/48 X |
| 5,237,257 | 8/1993 | Johnson et al. | 320/2 |
| 5,298,346 | 3/1994 | Gyenes | 429/90 |
| 5,399,446 | 3/1995 | Takahashi | 429/90 |

*Primary Examiner*—Edward Tso
*Attorney, Agent, or Firm*—Jenkens & Gilchrist

[57] ABSTRACT

An apparatus for identifying the identity of an accessory device connected to an electronic device using a voltage divider circuit, an analog to digital converter, and a database associating various digital values with the identity of various accessory devices. The voltage divider circuit includes a first resistor located within the electronic device and having a single resistance value. The voltage divider circuit also includes a second resistor located within the accessory device whose resistance value varies between accessories such that a distinct voltage value is applied to the analog to digital converter for each accessory. The digital output value of the analog to digital converter is compared with a list of values stored within the database to determine the identity of the accessory device.

3 Claims, 2 Drawing Sheets

APPARATUS FOR IDENTIFYING ACCESSORIES CONNECTED TO RADIOTELEPHONE EQUIPMENT

BACKGROUND OF THE INVENTION

1. Technical Field of the Invention

The present invention pertains in general to an apparatus for identifying accessories connected to an electronic device, and more particularly, to an apparatus which uses a voltage divider to identify accessories electrically connected to radiotelephone equipment.

2. Description of Related Art

Many electronic devices allow the connection of accessories in order to vary the operation of the electronic device or to incorporate additional functionality. It is often necessary for the electronic device to know the identity of the accessory connected to it in order that the electronic device may alter its operation, activate/deactivate various functionality, change parameters, or invoke software routines, etc. At present, there are various methods to identify accessories attached to an electronic device ranging from the simple to the complex. One approach is to provide one or more dual in-line package (DIP) switches which can be set to a variety of settings. These settings are read by the electronic device to identify the connected accessory. Another approach provides a plurality of switches located a various points on an interface connector of the electronic device. Each accessory to be connected to the electronic device has a mechanical finger at different points such that when each accessory is connected to the electronic device a different switch is activated. Each switch represents a different accessory and thus the accessory is identified. Yet another, more complicated method establishes a communication protocol between the electronic device and the accessory such that the electronic device can query the accessory for its identity.

At present, radiotelephones and their associated equipment do not employ any of these methods for identifying accessory device identity. As radiotelephones and their associated equipment become more versatile, however, a need is arising to employ some method to identify accessories attached to a radiotelephone and associated equipment. For instance, various sizes of batteries as measured in stand-by and talk time are available. Furthermore, various types of batteries such as nickel cadmium or metal hydroxide are available. The optimum recharge algorithm in terms of current strength and charging durations vary for each battery depending on its size and type. The recharge stations of today cannot determine the type and size of the battery connected to the station for recharge and therefore, uses a general recharge algorithm which is suboptimal. If a recharge station could identify the battery connected to it, it could adjust the charging current and duration to optimize the recharging of the particular battery. Other accessories which can be connected to radiotelephone equipment include: radiotelephone cradles which supply power, stronger transmitters, various speakers and microphones for hands-free operation and remote antennas. Thus, there is a need for a simple, inexpensive device for identifying the identity of accessory devices connected to radiotelephone equipment.

SUMMARY OF THE INVENTION

A first embodiment of the present invention comprises a voltage divider circuit using two resistors and an analog to digital converter for identifying the identity of an accessory device connected to an electronic device. A first resistor having a constant resistance value is located within the electronic device with one of its leads connected to a constant voltage source. A second lead of the resistor is connected to an input of an analog to digital converter and is further connected to a first interface terminal. A second interface terminal is also provided which is connected to internal ground of the electronic device.

Located within the accessory device is a second resistor having a resistance value that is unique to that particular accessory. A first lead of the resistor is connected to a first interface terminal and a second lead is connected to internal ground of the accessory device and further connected to a second interface terminal. When the accessory device is connected to the electronic device, the first interface terminal of the accessory device will make electrical contact with the first interface terminal of the electronic device such that the input to the analog to digital converter, the second lead of the resistor located within the electronic device, and the first lead of the resistor located within the accessory device are electrically connected through the first interface terminal of the electronic device and accessory device. The second lead of the resistor located within the accessory device together with the internal ground of the accessory device make electrical contact to the internal ground of the electronic device through the second interface terminal of the electronic device and accessory device.

When the accessory device is connected to the electronic device, electrical current flows from the constant voltage source through the resistor located within the electronic device then through the resistor located within the accessory device to electrical ground of the electronic device. The flow of current creates a voltage drop across each resistor providing a voltage at the input to the analog to digital converter. The value of this voltage (V) can be measured by the analog to digital converter and is a function of the value of the two resistors. By maintaining the power supply voltage and the resistance value of the resistor located within the electronic device constant, the resistance value of the second resistor located within the accessory device can be varied with each accessory device having a unique value thereby producing a unique voltage value applied to the analog to digital converter. Providing the electronic device with a list of voltage values correlated to the identities of accessory devices, allows the electronic device to determine the identity of the connected accessory by measuring the unique voltage value created.

A second embodiment of the present invention replaces the constant voltage power supply and first resistor of the first embodiment with a constant current power supply.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
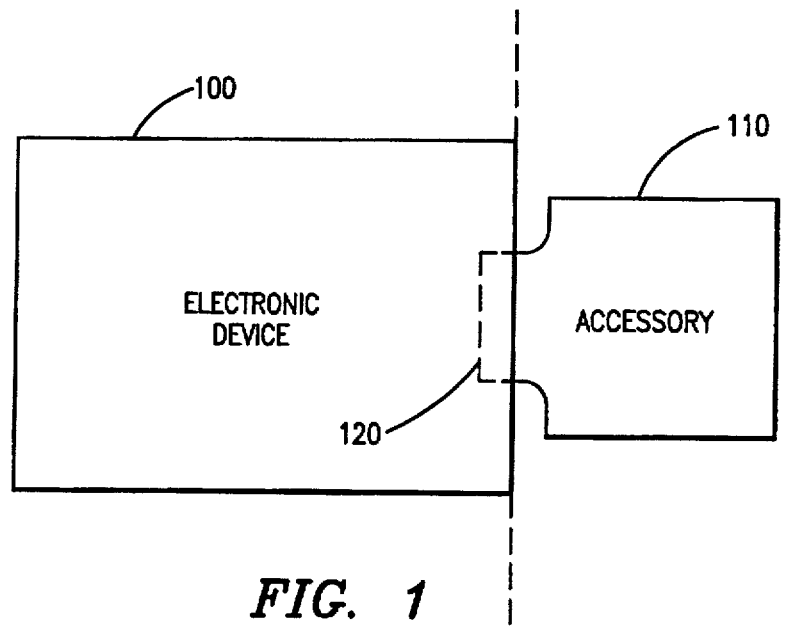
FIG. 1 illustrates a physical rendering of an embodiment of the present invention.

Referring now to FIG. 1, there is illustrated a physical rendering of an embodiment of the present invention. An electronic device 100 is connected to an accessory device 110 by means of an interface 120. The interface 120 can be of any type and facilitates an electrical connection between the functionality of the electronic device 100 and the functionality of the accessory device 110.

Figure 2:
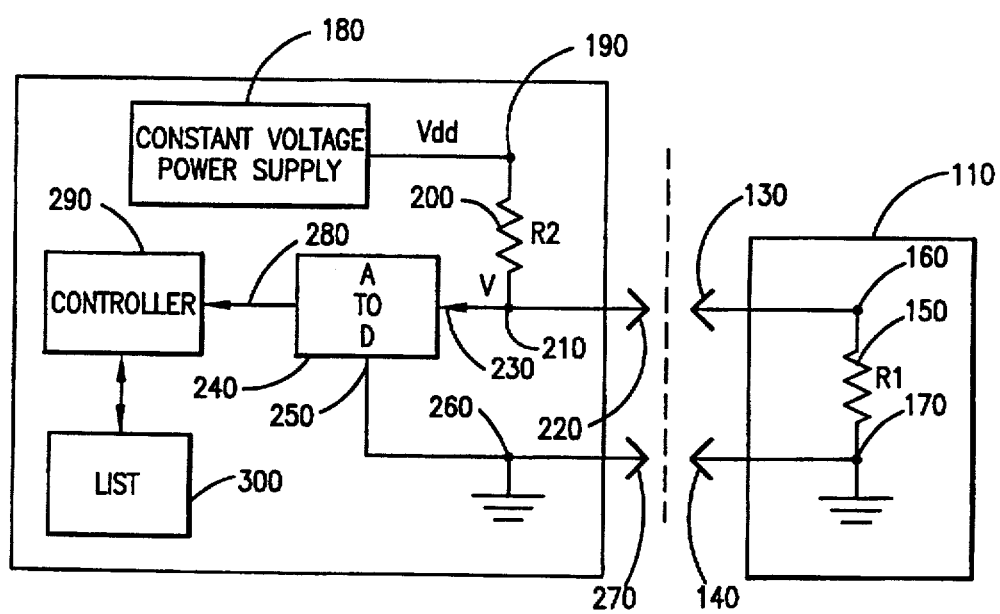
FIG. 2 illustrates a circuit diagram for an embodiment of the present invention incorporating a constant voltage source.

Further referring now to FIG. 2, there is illustrated a circuit diagram for an embodiment of the present invention incorporating a constant voltage source. Within the accessory device 110, a resistance path is created between interface terminals 130 and 140. The resistor 150 is shown as a standard resistor having a resistance value of (R1) ohms. The resistor 150 has a first lead 160 and a second lead 170. The first lead 160 of the resistor 150 is electrically connected to interface terminal 130 and the second lead 170 of the resistor 150 is electrically connected to interface terminal 140 and further electrically connected to electrical ground of the accessory device.

Within the electronic device 100, a power supply 180 provides a constant voltage (VDD) volts to a first lead 190 of a resistor 200 having a resistance value of (R2) ohms. A second lead 210 of the resistor 200 is electrically connected to an interface terminal 220 and further electrically connected to an analog input 230 of an analog to digital converter 240. The analog to digital converter 240 has a ground terminal 250, which is electrically connected to electrical ground 260 of the electronic device 100 and further electrically connected to a second interface terminal 270. The analog to digital converter 240 has a digital output 280 which is electrically connected to a controller 290.

Interface terminals 130 and 140 are mechanically fastened to an accessory end of an interface and interface terminals 220 and 270 are mechanically fastened to an electronic device end of an interface similar to the interface 120 of FIG. 1. In addition to the interface terminals described, the interface is likely to include other interface terminals which electrically connect the accessory device functionally to the electronic device functionality. When the accessory device is attached to the electronic device, interface terminals 130 and 220 are electrically connected and interface terminals 140 and 270 are electrically connected. The connections between the accessory 110 and the electronic device 100 allows current to flow from the constant voltage power supply 180 through resistor 200, both located within the electronic device 100, and resistor 150, located within the accessory 110, to the electrical ground 260 of the electronic device 100. The flow of current through resistor 200 and resistor 150 creates a voltage of value (V) volts on the analog input 230 of the analog to digital converter 240. The voltage which is created at the input 230 of the analog to digital converter can be calculated by the formula:

$$V = R1 \times (VDD/(R1+R2))$$

The voltage value (V) which is applied to the analog input 230 of the analog to digital converter 240 is converted to a digital value by the analog to digital converter 240. This digital value is communicated to the controller 290 via digital output terminal 280.

By maintaining the voltage (VDD) of the power supply 180, and the resistance value (R2) of resistor 200 constant, the resistance value (R1) of resistor 150 can be varied with each accessory device 110 such that a distinct voltage (V) is applied to the analog input 230 of the analog to digital converter 240 when different accessory devices 110 are connected to the electronic device 100. The controller 290 is thus provided with a distinct digital value from the analog to digital converter 240 for each accessory connected to the electronic device 100. A database 300 is also included within the electronic device 100 and is accessible by the controller 290. The database 300 contains a list of digital values representing the voltage (V) which is created when accessory devices 110 are connected to the electronic device 100 and the identity of the accessory device 110 which produces each digital output value. The controller can thus determine the identity of the accessory device 110. The database can also include additional information concerning the accessory device 110 such as power requirements, operating parameters, etc., which is necessary for the operation of the electronic device and accessory combination.

Figure 3:
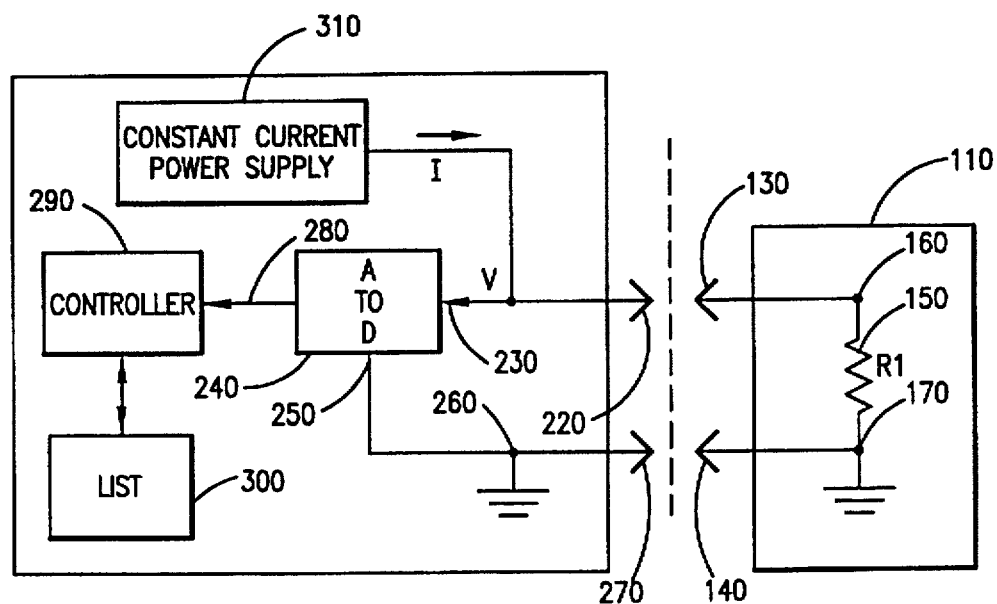
FIG. 3 illustrates a circuit diagram for an embodiment of the present invention incorporating a constant current source.

Referring now to FIG. 3, there is illustrated a circuit diagram for an embodiment of the present invention incorporating a constant current source. The embodiment illustrated in FIG. 3 replaces the constant voltage power supply 180 and resistor 200 both of FIG. 2, with a constant current power supply 310. The constant current power supply 310 supplies a constant current of (I) amperes. The constant current (I) flows through resistor 150 and creates a voltage (V) volts at the input 230 to the analog to digital converter 240. The voltage (V) can be calculated by the formula:

$$V = I \times R1$$

In all other respects, the operation of the circuit illustrated in FIG. 3 is identical to the circuit illustrated in FIG. 2.

Although the circuit diagram illustrated in FIG. 2 depicts the constant voltage power supply 180 and the resistor 200 as being located within the electronic device 100. The constant voltage power supply 180 and resistor 200 can instead be located within the accessory device 110 or can be located external to both the electronic device 100 and the accessory 110. While relocating these components requires modification to the mechanical connection of the components and interface terminals they are electrically connected identical to the embodiment depicted in FIG. 2. Likewise, the constant current power supply 310 of FIG. 3 can also be located within the accessory 110 or external to both the accessory 110 and the electronic device 100. Again while relocating these components requires modification to the mechanical connection of the components and interface terminals they are electrically connected identical to the embodiment depicted in FIG. 3. Yet another embodiment of the present invention relocates the analog to digital converter 240 and the database 300 to either within the accessory device 110 or external to both the accessory device 110 and the electronic device 100.

Although the resistance value of the resistors depicted in FIG. 2 and FIG. 3 can be any value. In most application the sum of the resistance in the voltage divider circuit is designed to be in the range of 100,000 to 800,000 ohms. The high value is chosen to minimize the current flow and thus minimize power consumption of the voltage divider circuit.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. An apparatus for identifying an accessory device connected to an electronic device from among a plurality of accessory devices, the apparatus comprising:

a constant current source for supplying a constant current;

a resistor of resistance distinct to each particular accessory in the plurality of accessory devices, the resistor having a first lead electrically connected to the constant current source, and the resistor further having a second lead electrically connected to electrical ground;

an analog to digital converter having an analog input electrically connected to the first lead of the resistor, the analog to digital converter for measuring the voltage level across the resistor, and the analog to digital converter further for creating a digital representation of the measured voltage level and communicating the digital representation of the measured voltage level to the electronic device; and a database accessible by the electronic device for associating the digital representation of the measured voltage level with the identity of the accessory device connected to the electronic device.

2. An apparatus for identifying an accessory connected to an electronic device from among a plurality of accessory devices, the apparatus comprising:

a constant current source located within the electronic device connected to a first interface terminal of the electronic device;

a resistor of resistance value distinct to each particular accessory in the plurality of accessory devices, the resistor located within the accessory device, the resistor having a first lead electrically connected to a first interface terminal of the accessory device, and the resistor further having a second lead electrically connected to a second interface terminal of the accessory device, and the second lead further is electrically connected to electrical ground of the accessory device;

an analog to digital converter located within the electronic device, the analog to digital converter having an analog input electrically connected to the first interface terminal of the electronic device, the analog to digital converter further having a ground terminal connected to electrical ground of the electronic device, the analog to digital converter for measuring the voltage level on the first interface terminal of the electronic device and converting the measured voltage level to a digital binary word and further for communicating the digital binary word to the electronic device;

an interface for connecting the first interface terminal of the electronic device to the first interface terminal of the accessory device and for connecting the second interface terminal of the electronic device to the second interface terminal of the accessory device; and a database accessible by the electronic device for associating the digital binary word with the identity of the accessory device connected to the electronic device.

3. An method for identifying an accessory connected to an electronic device from among a plurality of accessory devices, the apparatus comprising the steps of:

assigning each accessory device a distinct resistance value;

connecting a constant current source to a first lead of a resistor, a resistor having the assigned resistance value for the accessory connected to the electronic device;

connecting a second lead of the resistor to ground to form a current path from the constant current source through the resistor to ground;

measuring a voltage value across the second resistor;

associating each accessory device identity with the distinct voltage value created across the resistor as electrical current flows from the constant current source through the resistor of resistance value assigned to the particular accessory device to ground; and determining the accessory device identity through association with the measured voltage value.

* * * * *